United States Patent
Sumiyama et al.

(10) Patent No.: US 9,627,657 B2
(45) Date of Patent: Apr. 18, 2017

(54) CYLINDRICAL ALKALINE STORAGE BATTERY

(71) Applicant: PANASONIC CORPORATION, Osaka (JP)

(72) Inventors: Shinichi Sumiyama, Osaka (JP); Fumio Kato, Osaka (JP); Hideaki Ohyama, Osaka (JP); Kiyoshi Hayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 194 days.

(21) Appl. No.: 14/376,083

(22) PCT Filed: Feb. 22, 2013

(86) PCT No.: PCT/JP2013/001027
§ 371 (c)(1),
(2) Date: Jul. 31, 2014

(87) PCT Pub. No.: WO2013/125244
PCT Pub. Date: Aug. 29, 2013

(65) Prior Publication Data
US 2015/0024258 A1    Jan. 22, 2015

(30) Foreign Application Priority Data
Feb. 24, 2012 (JP) ................. 2012-038459

(51) Int. Cl.
*H01M 6/04* (2006.01)
*H01M 2/02* (2006.01)
(Continued)

(52) U.S. Cl.
CPC ......... *H01M 2/022* (2013.01); *H01M 2/0413* (2013.01); *H01M 2/08* (2013.01);
(Continued)

(58) Field of Classification Search
CPC .................................................... H01M 6/04
See application file for complete search history.

(56) References Cited

U.S. PATENT DOCUMENTS

| 4,220,695 A | 9/1980 | Ishida et al. |
| 5,885,732 A * | 3/1999 | Verhoog ............. H01M 2/0262 429/120 |

(Continued)

FOREIGN PATENT DOCUMENTS

| EP | 2031671 A1 | 3/2009 |
| JP | S54-011442 A | 1/1979 |

(Continued)

OTHER PUBLICATIONS

Japanese Office Action issued in the corresponding Japanese Patent Application No. 2014-500604 dated Aug. 4, 2015.
(Continued)

*Primary Examiner* — Jacob Marks
(74) *Attorney, Agent, or Firm* — McDermott Will & Emery LLP

(57) ABSTRACT

An alkaline storage battery includes: a cylindrical case having a side wall including an opening end portion and a bottom; a sealing plate; a gasket interposed between the sealing plate and the opening end portion; and a sealant between the gasket and the opening end portion. The side wall has an annular groove opened at an outer surface thereof, and an inwardly curl portion at the opening end portion. In at least part of the groove, the minimum width L1 is within 0.2 mm. The sealant includes a polyamide resin formed such that when two test-plate materials are bonded together at bonding faces facing each other via a bonding portion of the sealant, and moved in parallel with the bonding faces and in opposite directions to have a relative (Continued)

displacement within 0.5 to 5 mm, a stress at least 0.02 N/mm² is applied to the bonding portion.

7 Claims, 10 Drawing Sheets

(51) Int. Cl.
    *H01M 2/08* (2006.01)
    *H01M 2/04* (2006.01)
    *H01M 10/28* (2006.01)
    *H01M 10/04* (2006.01)

(52) U.S. Cl.
    CPC ....... *H01M 10/0422* (2013.01); *H01M 10/28* (2013.01); *H01M 10/286* (2013.01); *H01M 10/288* (2013.01); *H01M 2/046* (2013.01); *H01M 6/04* (2013.01); *H01M 2300/0014* (2013.01); *Y02E 60/124* (2013.01)

(56) References Cited

U.S. PATENT DOCUMENTS

| | | | |
|---|---|---|---|
| 2009/0035650 A1 | 2/2009 | Fujiwara et al. | |
| 2009/0169988 A1* | 7/2009 | Kato | H01M 2/0235 429/174 |

FOREIGN PATENT DOCUMENTS

| | | | |
|---|---|---|---|
| JP | 57-103258 A | | 6/1982 |
| JP | 59-72658 U | | 5/1984 |
| JP | 62-126545 A | | 6/1987 |
| JP | 01-195654 A | | 8/1989 |
| JP | H-4-91055 U | | 8/1992 |
| JP | 2000-268782 A | | 9/2000 |
| JP | 2004-228035 | * | 8/2004 |
| JP | 2004-228035 | | 8/2004 |
| JP | 2005-293922 A | | 10/2005 |
| JP | 2009-037917 A | | 2/2009 |
| JP | 2009-230991 A | | 10/2009 |
| JP | 2011-014371 A | | 1/2011 |

OTHER PUBLICATIONS

Extended European Search Report issued in European Application No. 13751885.8 dated Oct. 24, 2014.
International Search Report issued in International Application No. PCT/JP2013/001027 with Date of mailing Apr. 16, 2013, with English Translation.

* cited by examiner

CYLINDRICAL ALKALINE STORAGE BATTERY

RELATED APPLICATIONS

This application is a national phase of International Application No. PCT/JP2013/001027, filed on Feb. 22, 2013, which in turn claims the benefit of Japanese Application No. 2012-038459, filed on Feb. 24, 2012, the disclosures of which Applications are incorporated by reference herein.

TECHNICAL FIELD

The present invention relates to cylindrical alkaline storage batteries, specifically to a sealing structure of a sealing portion where the opening of an outer can is sealed.

BACKGROUND ART

Alkaline storage batteries can be classified into nickel-cadmium storage batteries, nickel-metal hydride storage batteries, and others, depending on the active material included therein, and into cylindrical, prismatic, and other batteries, depending on the shape thereof. In cylindrical alkaline storage batteries, a spiral electrode group formed by winding a negative electrode and a positive electrode with a separator interposed therebetween is housed together with an electrolyte (liquid alkaline electrolyte), in a cylindrical outer can (battery case) having a side wall including an opening end portion, and a bottom.

One of the current collecting structures of cylindrical alkaline storage batteries is such that: the negative electrode is arranged at the outermost periphery of the spiral electrode group, and the negative electrode at the outermost periphery is brought into contact with the inner surface of the side wall of the metal battery case, allowing the battery case to serve as a negative external terminal; and the positive electrode is connected via a positive electrode lead to a metal sealing member (including a sealing plate and an external terminal plate) for sealing the opening of the battery case, allowing the sealing member to serve as a positive external terminal. For preventing leakage of alkaline electrolyte, a resin packing (gasket) is disposed where the peripheral edge portion of the sealing plate is to contact with the inner surface of the opening end portion of the battery case.

In alkaline batteries (including alkaline storage batteries and alkaline dry batteries) which use an alkaline electrolyte as the electrolyte, however, it is sometimes difficult to seal the opening of the battery case with a resin gasket only without causing leakage in hot and humid conditions. This is due to a possible presence of water at the sealing portion between the opening end portion of the battery case which is electrically negatively charged, and the peripheral edge portion of the sealing plate. The water, if any, causes a reaction represented by the formula "$H_2O+e^-\rightarrow OH^-+\frac{1}{2}H_2$" to proceed at the sealing portion. In association therewith, the electrolyte creep phenomenon becomes likely to occur because of the cation migration of metal salts in the alkaline electrolyte, such as $K^+$, $Na^+$ and $Li^+$. Therefore, conventionally, in alkaline batteries, for further improving the sealing by the gasket, a sealant has been provided between the gasket and the inner surface of the opening end portion of the battery case (see Patent Literatures 1 and 2).

Moreover, in alkaline storage batteries being secondary batteries, as compared with alkaline dry batteries being primary batteries, the internal pressure rises as the charge proceeds, and therefore, it is further difficult to prevent electrolyte leakage at the sealing portion.

Patent Literature 1 discloses, as a material of the aforementioned sealant, a soft polymer to which an imidazole compound is added. For the purpose of providing an alkaline dry battery having high impact resistance so that no leakage will occur even when the battery sealing portion is deformed by an impact such as battery drop, Patent Literature 2 suggests using a sealant mainly composed of a polyimide resin and having predetermined adhesiveness or spreadability.

Patent Literature 3 discloses, for the purpose of achieving a higher capacity and a lighter weight by reducing the wall thickness of the container in alkaline storage batteries, the following configuration. Specifically, an upper portion of a cylindrical drum of a bottom-closed metal container of an alkaline storage battery is bent in two steps so as to be flared upward, and an electrode group is housed in the container having a flared cylindrical raised portion. After a liquid electrolyte is housed in the container, an insulating gasket is placed on a step portion under the raised portion of the container. Into the gasket, a sealing plate provided with a terminal cap on its top is placed. Subsequently, the raised portion of the container is reduced in diameter, and then the upper edge of the raised portion is curled. In that way, the sealing plate is compressed and secured via the gasket. Here, the bottom-closed cylindrical metal container satisfies the relationship $t1 \geq t2 \geq t3$ or $t1 > t2 = t3$, where t1 is a thickness at a first bend in the direction from the drum portion toward the raised portion, t2 is a thickness of a portion between the first bend and a second bend in that direction, and t3 is a thickness of the drum portion and the raised portion.

CITATION LIST

Patent Literature

[PTL 1] Japanese Laid-Open Patent Publication No. 2011-14371
[PTL 2] Japanese Patent Publication No. 4713550
[PTL 3] Japanese Laid-Open Patent Publication No. 2000-268782

SUMMARY OF INVENTION

Technical Problem

In general, in various batteries whose sizes are standardized, it is required to effectively utilize the internal space of the battery case, so that the battery case can accommodate more power generation elements, particularly more active material. This can achieve a higher capacity of various batteries. In order to increase an available space within the battery case (hereinafter referred to as "effective volume"), it is important to reduce the wall thickness of the battery case, and make more compact the sealing structure for sealing the opening end portion of the battery case, while keeping the sufficient sealing.

A battery case for cylindrical secondary batteries including cylindrical alkaline storage batteries has an annular groove portion formed along the opening end portion of its side wall. A sealing plate is held, at its peripheral edge portion, between the side wall of the battery case forming the groove portion (hereinafter sometimes referred to as "groove-forming wall") and a curl portion formed by curling inward the opening end of the battery case, and the sealing plate is secured by crimping (hereinafter sometimes referred to as "crimp-sealing"). In such a sealing structure, by reducing the width of the groove portion constituting part of the crimp portion to be as small as possible, the sealing structure is made compact, and the volume of the battery case can be increased in the longitudinal direction (axis direction) even though the height of the battery is unchanged. In that way, the effective volume can be increased.

For the reasons above, a processing to reduce the width of the groove portion is performed (see FIG. 2, hereinafter sometimes referred to as "groove-width compression processing"). However, when the width of the groove portion is reduced, the strength thereof is reduced accordingly, which makes it difficult to keep the gasket compression enough to realize a desired resistance to leakage.

Furthermore, the crimp-sealing of the opening end portion of the battery case is often followed by a groove-width compression processing or a processing to reduce the diameter of the battery case (see FIGS. 4 to 8, hereinafter sometime referred to as "diameter reduction processing"). In this case, non-unidirectional stress is applied to the groove portion constituting part of the crimp portion, and the gasket and the side wall of the battery case which are in contact with each other with the sealant therebetween are relatively displaced by about 0.5 to 2 mm. This sometimes makes it difficult to maintain sufficient adhesion between the gasket and the sealing member. Note that the groove-width compression processing cannot be performed on alkaline dry batteries, since in alkaline dry batteries the active material expands as the discharge proceeds in the axis direction of the battery case, increasing the overall height of the battery.

With regard to the foregoing, sufficient adhesion between the gasket and the sealing member is difficult to maintain by only adding an imidazole compound to the soft polymer as disclosed by Patent Literature 1. For example, when the gasket compressibility is lowered to nearly zero by an impact of battery drop etc., the gasket and the sealant may have a gap therebetween. Under such circumstances, leakage of alkaline electrolyte cannot be prevented completely even if the sealant has high adhesion. In this regard, the same applies to Patent Literature 3, which simply discloses favorable dimensions of the sealing structure.

In Patent Literature 2, which uses a sealant mainly composed of a polyamide resin, sufficient sealing against the impact as mentioned above may possibly be obtained in alkaline dry batteries. However, in alkaine storage batteries, as described above, sufficient sealing is more difficult to obtain than in alkaline dry batteries. Moreover, in alkaline storage batteries being secondary batteries, the polyamide resin having entered the electrode group, if any, will cause nitric acid ions ($NO_3^-$) to leach out into the electrolyte, and a so-called "shuttle reaction" occurs between the positive electrode and the negative electrode. Specifically, the leached $NO_3^-$ is reduced at the negative electrode into nitrogen-containing impurities such as nitrous acid ions ($NO_2^-$) or ammonium ions ($NH_4^+$), which are then oxidized at the positive electrode into nitric acid ions ($NO_3^-$). This, as a result, increases the self-discharge and degrades the battery performance.

In view of the above, the present invention intends to provide a cylindrical alkaline storage battery capable of preventing leakage of alkaline electrolyte, as well as increasing the battery capacity.

Solution to Problem

To achieve the purpose as described above, a cylindrical alkaline storage battery including:
an electrode group including a positive electrode, a negative electrode, and a separator;
an alkaline electrolyte;
a cylindrical battery case that has a side wall including an opening end portion, and a bottom, and that accommodates the electrode group and the electrolyte and is connected to one of the positive electrode and the negative electrode;
a sealing plate for sealing the opening end portion;
an external terminal plate that has a protrusion, and that is arranged in contact with the sealing plate and connected to the other one of the positive electrode and the negative electrode via the sealing plate;
a gasket interposed between a peripheral edge portion of the sealing plate and an inner surface of the opening end portion; and
a sealant for providing sealing between the gasket and the inner surface of the opening end portion is provided.

The side wall has: an annular groove portion that is open at an outer surface of the side wall, and that is formed along the opening end portion so as to be adjacent to the opening end portion; and a curl portion where the opening end portion is curled inward.

The curl portion, together with the side wall at a portion forming the groove portion, sandwiches the peripheral edge portion of the sealing plate to secure the sealing plate at the opening end portion of the battery case.

In at least part of the groove portion, the minimum value of a groove width L1 is within 0.2 mm.

The sealant includes a polyamide resin, and is formed such that when two test-plate materials are bonded together at bonding faces that face each other via a bonding portion formed of the sealant, and moved in parallel with the bonding faces and in opposite directions under the condition that a relative displacement amount is within the range of 0.5 to 5 mm, a stress at least 0.02 N/mm² is applied to the bonding portion.

Preferably, in the cylindrical alkaline storage battery, a groove (groove portion) provided in an opening portion (opening end portion) of an outer can (battery case) and a sealing member comprising an electrically conductive positive terminal (external terminal plate) and a lid plate (sealing plate) are crimped via a ring-shaped insulating packing therebetween. A sealant mainly composed of a polyamide resin is provided between the rim of the outer can and the ring-shaped insulating packing. An electrode group and an alkaline electrolyte are inserted into the outer can. The electrolyte group includes belt-shaped negative and positive electrodes and a separator interposed therebetween which are spirally wound such that the negative electrode is arranged at the outermost periphery of the electrode group. The sealing member has a gas vent hole at its center, and on its outer face, a valve member made of rubber is placed so as to close the gas vent hole. The sealing member, which comprises the hat-shaped positive terminal having the gas vent hole and pressing and closing the valve member, and the lid plate supporting the positive terminal, functions such that when gas is generated within the outer can to raise the internal pressure, the valve member is compressed to release the gas through the gas vent hole. The sealant is formed so as to exhibit a tensile strength (bonding-portion stress) of 0.02 N/mm² or more in the range where a tensile distortion (relative displacement amount) is 0.5 mm to 5.0 mm. The battery case is formed such that the minimum value of a vertical distance L1 of the groove is within 0.2 mm.

Advantageous Effects of Invention

According to the present invention, alkaline electrolyte leakage can be prevented, and the battery capacity can be increased. Furthermore, according to a preferable embodiment of the present invention, deterioration in battery performance such as increase in self-discharge can also be prevented.

DESCRIPTION OF EMBODIMENTS

The present invention relates to a cylindrical alkaline storage battery including: an electrode group including a positive electrode, a negative electrode, and a separator; an alkaline electrolyte; a cylindrical battery case that has a side wall including an opening end portion, and a bottom, and that accommodates the electrode group and the electrolyte and is connected to one of the positive electrode and the negative electrode; a sealing plate for sealing the opening end portion; an external terminal plate that has a protrusion, and that is arranged in contact with the sealing plate and connected to the other one of the positive electrode and the negative electrode via the sealing plate; a gasket interposed between a peripheral edge portion of the sealing plate and an inner surface of the opening end portion; and a sealant for providing sealing between the gasket and the inner surface of the opening end portion.

The side wall of the battery case has: an annular groove portion that is open at an outer surface of the side wall, and that is formed along the opening end portion so as to be adjacent to the opening end portion; and a curl portion where the opening end portion is curled inward. The curl portion, together with the side wall at a portion forming the groove portion (hereinafter sometimes referred to as "groove-forming wall"), sandwiches the peripheral edge portion of the sealing plate, and in this state, crimping is performed so that the sealing plate is secured at the opening end portion.

Figure 1A:
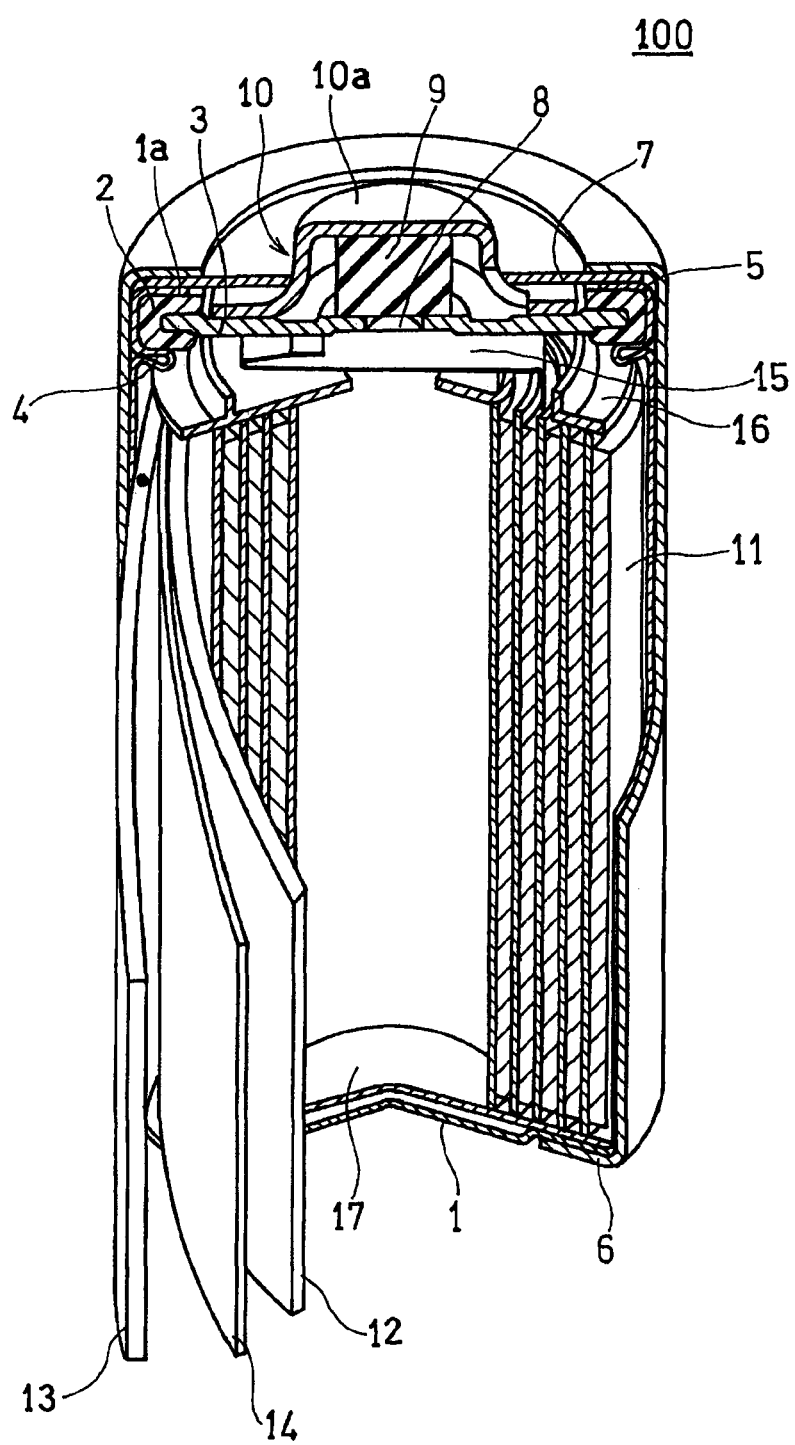
FIG. 1A A partially cut-away oblique view of a cylindrical alkaline storage battery according to one embodiment of the present invention FIG. 1B An enlarged cross-sectional view of an essential part of the battery of FIG. 1A FIG. 1C An enlarged cross-sectional view of another essential part of the battery of FIG. 1A FIG. 2 A cross-sectional view of groove-width compressing (press-fitting) tools FIG. 3 (a) An illustration of one step of measuring the spreadability of a sealant in an embodiment of the present invention, and (b) an illustration of the next step of FIG. 3 (a)
Figure 1B:
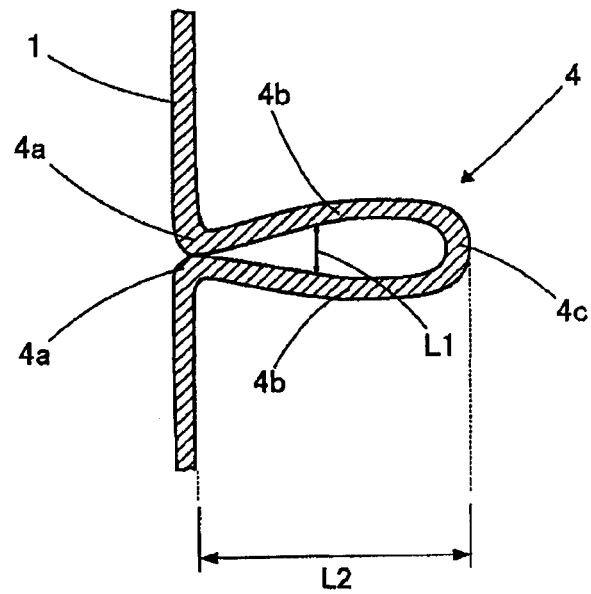

In at least part of the groove portion, the minimum value of a groove width L1 is within 0.2 mm. The "groove width" herein refers to the distance (spacing) L1 either between two opening edges 4a (see FIG. 1B) or between two sides 4b, or both, of the groove portion. In other words, the groove portion is formed such that, in at least part of the groove portion typically provided so as to circumferentially encircle the side wall of the battery case, the minimum value of the above spacing (L1) is within 0.2 mm. The minimum value of the spacing is herein referred to as "minimum spacing Lm1". In the present embodiment, the minimum spacing Lm1 of the groove portion is within 0.2 mm at somewhere in the groove portion encircling the side wall. It is to be noted that the opening of the groove portion is not necessarily open actually, and may be in such a state that, as shown in FIG. 1B, the opening edges 4a facing each other in the axis direction of the battery case (vertical direction of the figure) are in contact with or press-fitted to each other. In this case, the minimum spacing Lm1 is zero. The sides 4b, too, may be in contact with or press-fitted to each other.

The sealant includes a polyamide resin having a property as an adhesive, as described below. Specifically, when two test-plate materials are bonded together at bonding faces that face each other via a bonding portion formed of the sealant, and moved in parallel with the bonding faces and in opposite directions under the condition that the relative displacement amount is within the range of 0.5 to 5 mm, a stress of at least 0.02 N/mm$^2$ is applied to the bonding portion. Here, the two test-plate materials may be formed of any material without limitation. Preferably, one is formed of the same material as that of the side wall of the battery case or a material of the same type (e.g., nickel-plated steel plate), and the other is formed of the same material as that of the gasket or a material of the same type (e.g., nylon).

In the above configuration, the sealing plate can be secured at the opening end portion of the battery case by sandwiching and compressing the peripheral edge portion of the sealing plate, via the gasket, between the groove-forming wall and the curl portion formed by bending or curling the opening end portion of the battery case inward (crimp processing). After crimp processing, for example, the groove portion constituting part of the crimp portion is compressed in the axis direction of the battery case, and thus the groove width can be reduced to within 0.2 mm (groove-width compression processing, see FIG. 2). In that way, the groove portion is compressed in the width direction, and the height of the battery and the volume of the groove portion can be reduced. As a result, the sealing structure becomes compact, which can increase the effective volume of the battery case. In that way, the battery capacity can be easily increased. Here, the opening edges facing each other and/or the two sides of the groove portion are preferably press-fitted to each other by the above groove-width compression processing.

Figure 4:
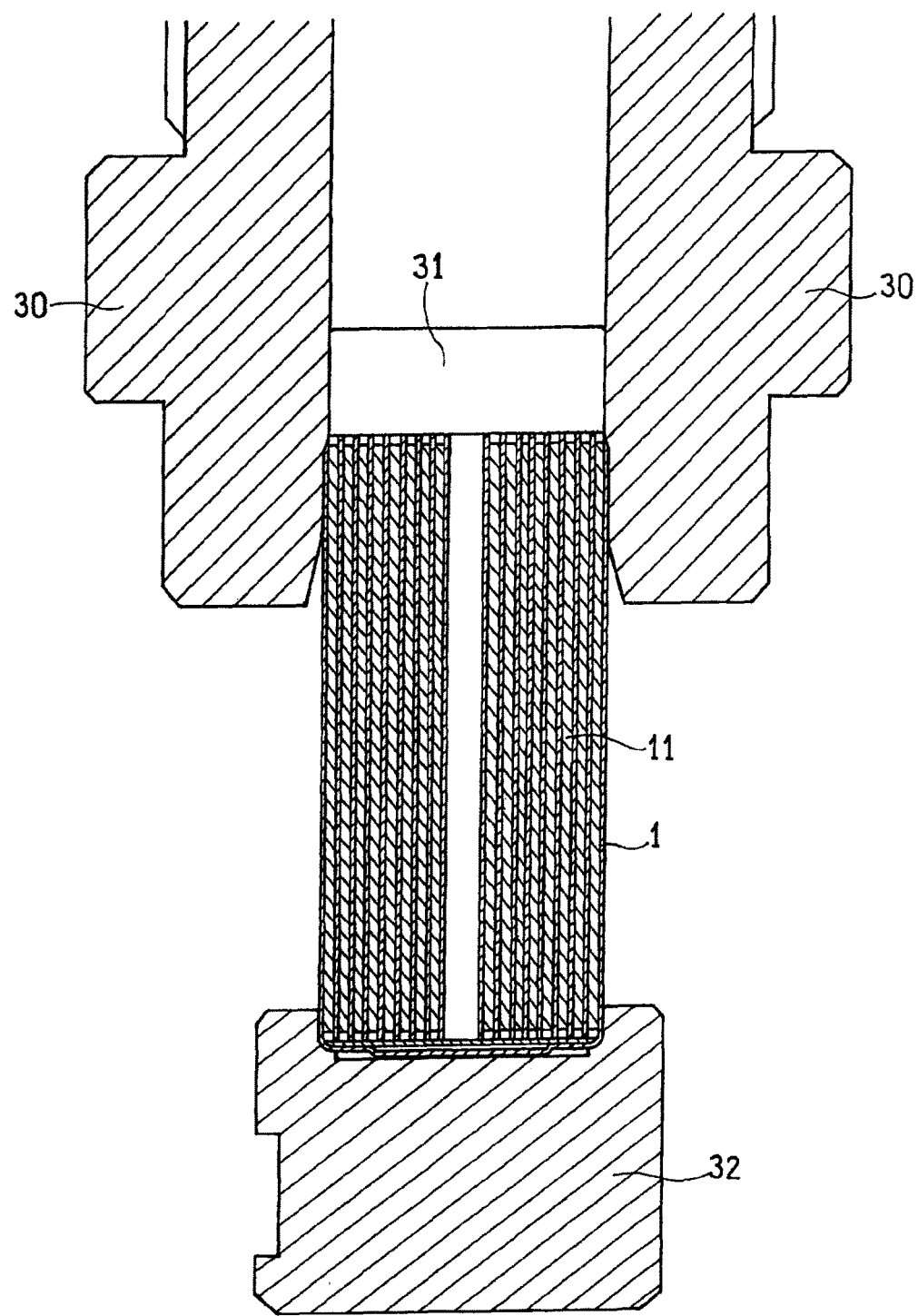
FIG. 4 A cross-sectional view illustrating the positional relationship between diameter-reducing dies and a battery, when the opening end portion of a battery case is reduced in diameter after an electrode group is inserted into the battery case FIG. 5 A cross-sectional view illustrating the positional relationship between a diameter-reducing die and a battery, when diameter reduction is performed, after an electrode group and an alkaline electrolyte are inserted into the battery case and a sealing plate is secured by crimping via a gasket FIG. 6 A cross-sectional view illustrating the positional relationship between the diameter-reducing die and the battery, when the battery case is reduced in diameter after crimping FIG. 7 A cross-sectional view of grooving tools FIG. 8 A schematic illustration of a sealant-application region FIG. 9 A graph showing the spreadability of sealants used in Examples of the present invention FIG. 10 A partially cut-away oblique view of a cylindrical alkaline storage battery in which a doughnut-shaped insulating plate is disposed between the battery case and the positive terminal FIG. 11 A partially cut-away oblique view of a cylindrical alkaline storage battery in which a doughnut-shaped leakage preventing plate is disposed so as to completely cover the curl portion
Figure 5:
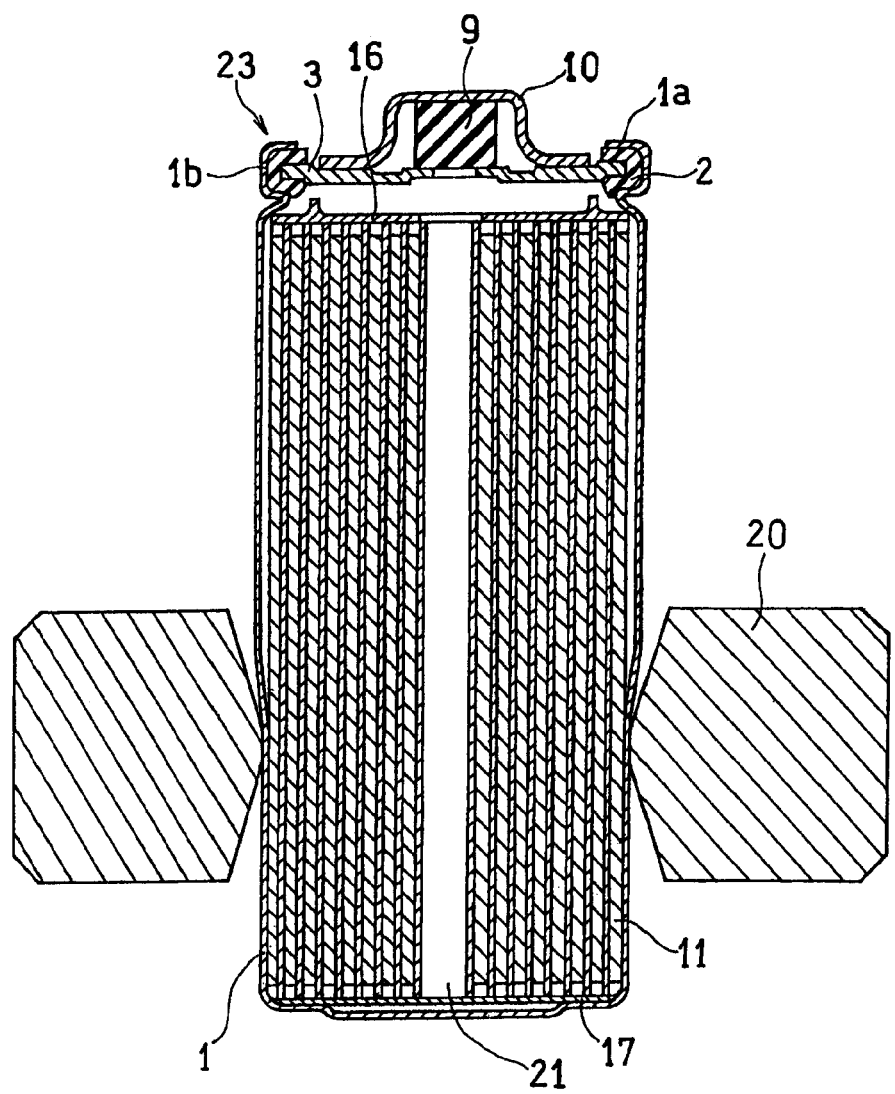
Figure 6:
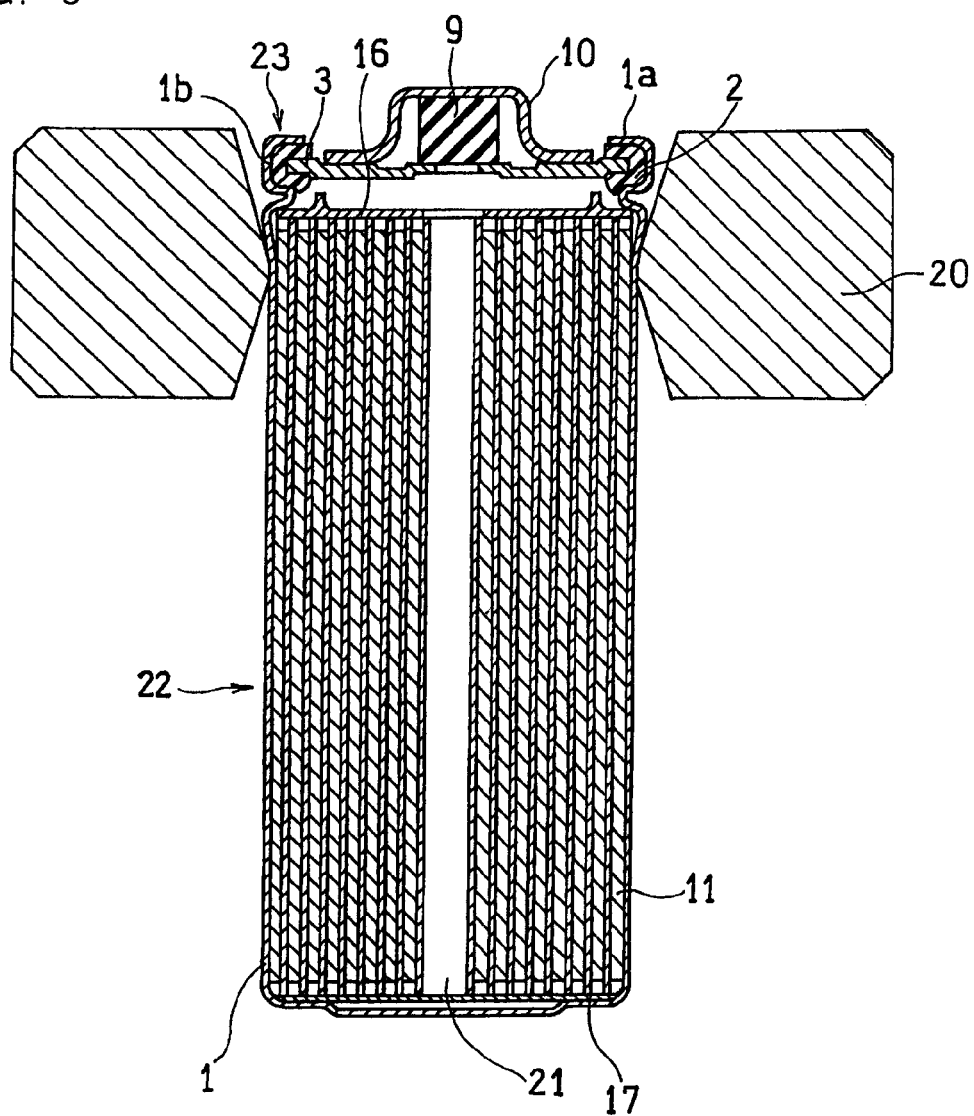

Furthermore, it may be possible to increase the effective volume of a cylindrical alkaline storage battery whose size is standardized, by forming a battery case so as to have a larger diameter than the design size, and reducing the diameter to the design size after housing an electrode group and an electrolyte in the battery case (diameter reduction processing, see FIGS. 4 to 6). In that way, an electrode group with a largest possible diameter can be easily housed in the battery case. Thus, a battery utilizing the internal space of the battery case as much as possible can be easily produced.

However, in the case of performing the groove-compression processing and diameter reduction processing as described above, in addition to a grooving processing for providing the battery case with a groove portion, non-unidirectional stress is applied to the side wall of the battery case, particularly to the groove portion. This may reduce the strength of the crimp portion including the groove portion and the curl portion. Moreover, due to the stress as above applied to the battery case after crimping, the crimp portion may be enlarged in diameter. As a result, the gasket compressibility may be lowered, or a gap may be created between the outer peripheral surface of the ring-shaped gasket and the inner surface of the crimp portion.

Even under the situation as above, in the present invention, since the sealant has adhesiveness or spreadability as described above, the sealant can spread to follow the deformation of the groove and other portions, with maintaining its stickiness. Therefore, the sealing between the opening end portion of the battery case and the gasket can be ensured. Furthermore, since the sealant has spreadability as described above, the sealant will not be broken by the stress associated with width-compression processing and diameter reduction processing, and it will not happen that a broken piece of the sealant enters the interior of the electrode group, to cause the aforementioned shuttle reaction, thereby to degrade the battery performance. Therefore, little or no reduction in leakage resistance will occur, even in cylindrical alkaline storage batteries (secondary batteries), in which alkaline electrolyte leakage due to creeping is more likely to occur than in cylindrical alkaline dry batteries (primary batteries). It is possible, therefore, to provide an alkaline storage battery capable of achieving a higher capacity.

Here, the polyamide resin included in the sealant preferably has an amine value of 45 to 150. In general, the higher the amine value is, the more viscous the polyamide resin is; the lower the amine value is, the harder the polyamide resin is. Setting the amine value of the polyamide resin within the above range can allow the sealant to have spreadability as described above, as well as can prevent the polyamide resin included in the sealant from entering the interior of the electrode group.

Figure 2:
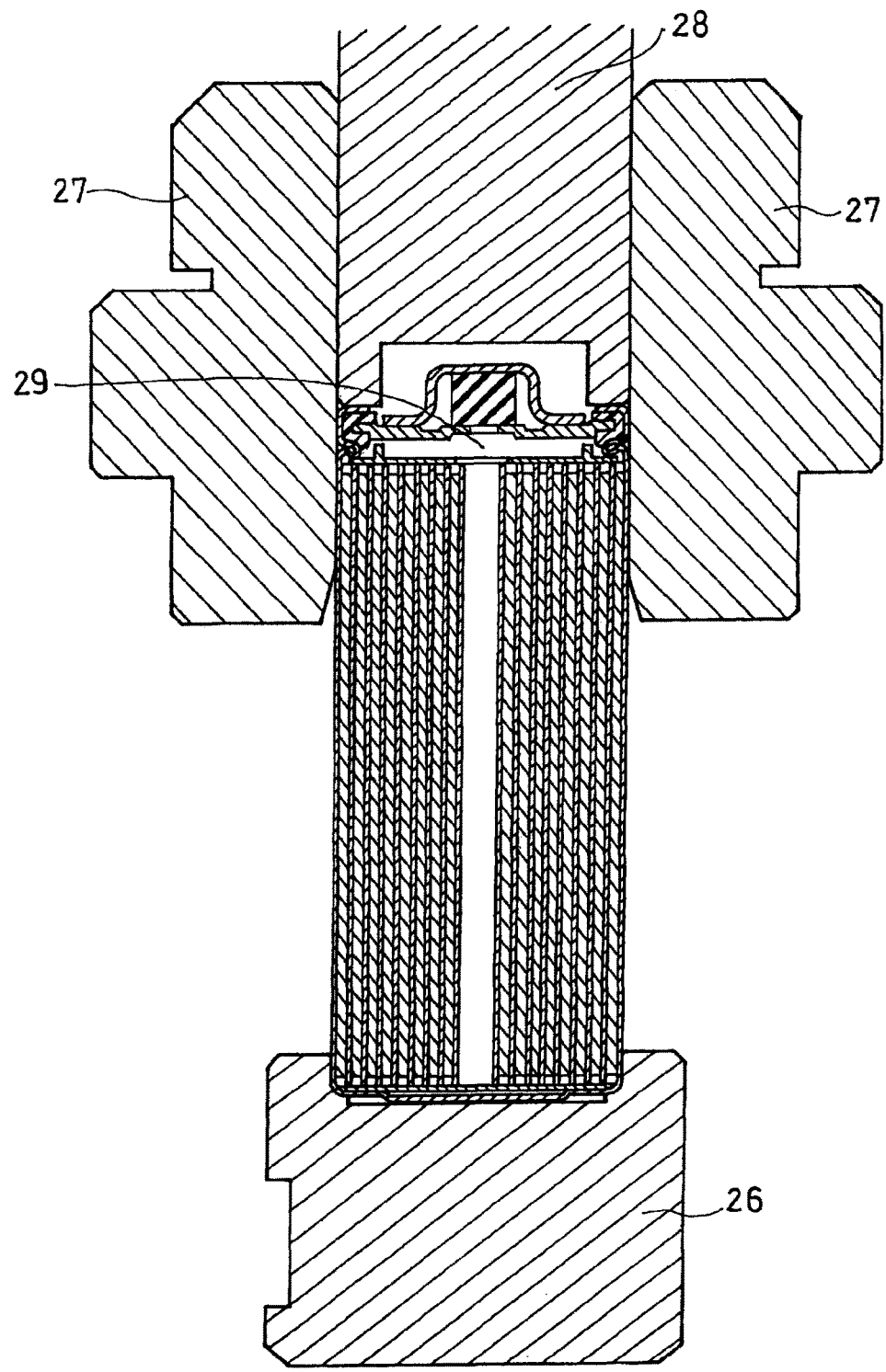

Furthermore, setting the thickness of the side wall, particularly the thickness of the side wall except the portion forming the groove portion, to 0.09 mm or more can prevent the occurrence of buckling on the battery case when, for example, the width-compression processing is applied to the battery case. Setting the thickness of the side wall except the portion forming the groove portion of the battery case to 0.14 mm or less can increase the capacity. In addition, as shown in FIG. 1B, setting a projecting height L2 of the groove-forming wall in the inward direction of the battery case to 0.3 mm or more can provide sufficient strength and height (projecting height in the inward direction of the battery case) to the groove portion which, with the curl portion, compressedly sandwiches the peripheral edge portion of the sealing plate. As a result, for example, when the groove-width compression processing is conducted using tools as shown in FIG. 2 after crimping, it is possible to prevent the gasket from slipping downward from the groove portion (toward the bottom of the battery case). This allows the gasket to be reliably held between the inner surface of the opening end portion of the battery case and the outer peripheral surface of the sealing plate, and can more reliably prevent leakage. The thickness of the groove-forming wall is preferably set to 0.17 to 0.19 mm. This can impart a sufficient strength to the groove portion, while achieving a higher capacity.

Figure 1C:
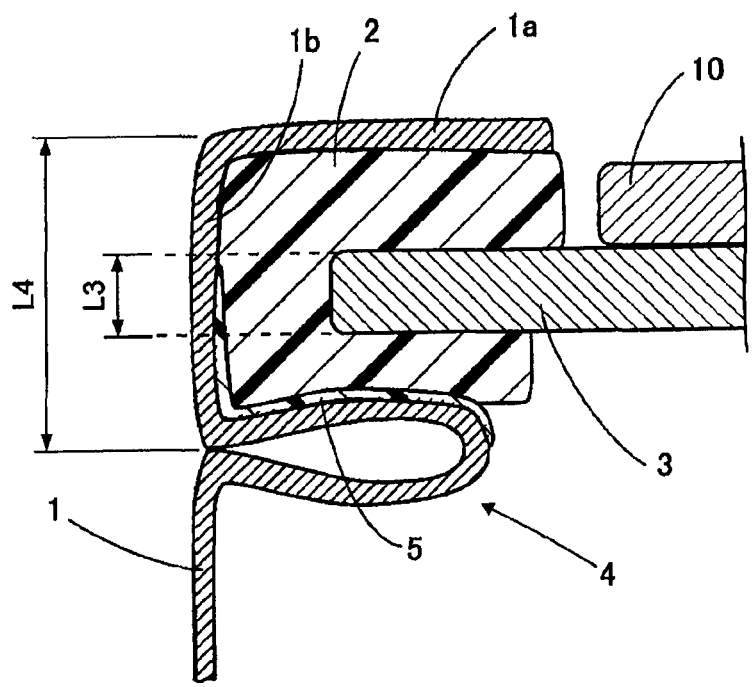

It is also preferable that the side wall of the battery case has, between the curl portion and the groove portion, a flat portion having a width L4 which is 1.4 to 4 times as large as a thickness L3 of the peripheral edge portion of the sealing plate ($1.4 \times L3 \le L4 \le 4 \times L3$) (see FIG. 1C). In this configuration, the difference between the outer diameter of the flat portion and that of a body portion of the side wall of the battery case is within 0.06 mm. The body portion is a portion other than the curl, groove, and flat portions, i.e., a portion other than the crimp portion.

The body portion accommodates an electrode group, while the crimp portion accommodates a gasket. Therefore, after crimping, the crimp portion will have a larger diameter than the body portion. To reduce the diameter of the crimp portion to the design size, the difference between the outer diameter of the crimp portion and that of the body portion is desirably 0.06 mm at most. Therefore, for example, after crimping, the diameter reduction processing is applied to both the crimp portion and the body portion, or only to the crimp portion. By applying the diameter reduction processing to the crimp portion, the flat portion having the width L4 is formed between the curl and groove portions of the crimp portion.

To make the difference between the outer diameter of the crimp portion and that of the body portion within 0.06 mm, it is desirable to apply the diameter reduction processing after crimping, to both the crimp portion and the body portion, or only to the crimp portion, to an extent that the flat portion having the width L4 is formed. In this case, it may happen that the compressibility of the peripheral end portion of the gasket is lowered, or a gap is created between the inner surface of the opening end portion of the battery case and the outer peripheral surface of the gasket. Even under such situation, the sealing can be ensured, since the sealant has spreadability as described above.

Furthermore, the present invention can be suitably applied to the case where a maximum height of surface roughness ($R_{max}$) of the inner surface of the side wall of the battery case in the portion from the curl portion to the groove portion, i.e., in the crimp portion, is 1.2 to 6 times as large as that in the portion other than that (i.e., the body portion). For example, prior to crimping, the diameter reduction processing is applied in advance to an area of the side wall of the battery case where the crimp portion is to be formed (hereinafter sometimes referred to as "area-to-be-crimp-portion") (see FIG. 4). This can prevent the diameter of the crimp portion from becoming larger by crimping, i.e., prevent the crimp portion and the body portion from having a large difference in diameter. This can eliminate the necessity of applying the diameter reduction processing to the crimp portion after crimping, or can lower the extent to which the diameter reduction processing is applied. As a result, the shape of the crimp portion once formed (sealing shape) will not or is unlikely to be deformed by the diameter reduction processing. It is therefore possible to prevent the crimp portion and the body portion of the battery case thus produced from having a difference in diameter exceeding 0.06 mm.

However, when such diameter reduction processing is applied to the area-to-be-crimp-portion prior to crimping, it may happen that the maximum height of surface roughness ($R_{max}$) of the inner surface in the crimp portion becomes 1.2 to 6 times as large as that in the body portion, causing a gap between the inner surface of the crimp portion and the gasket. In the present invention, the sealant having spreadability as described above can spread to follow the deformation, while maintaining its stickiness. Therefore, even under the situation as above, the sealing between the battery case and the gasket can be ensured sufficiently.

Preferably, the cylindrical alkaline storage battery further includes a doughnut-shaped leakage preventing plate. The leakage preventing plate has, at its center portion, a hole through which the protrusion of the external terminal plate is fittingly inserted, and the entire peripheral edge portion thereof comes in contact with the curl portion. By arranging the leakage preventing plate as above, even though the alkaline electrolyte leaks from between the crimp portion and the gasket, the leaked electrolyte can be confined inside the leakage preventing plate. Therefore, leakage of alkaline electrolyte to the exterior can be prevented. It is further preferable to secure the leakage preventing plate by covering the peripheral edge portion thereof from outside with, for example, an outer label which covers the outside of the battery case. In that way, without a special support structure for the leakage preventing plate, the leakage preventing plate can be installed. Therefore, the number of components can be decreased, and the increase in the production cost of the cylindrical alkaline storage battery can be suppressed.

Here, the leakage preventing plate preferably includes polypropylene, and has a thickness of 0.05 to 0.3 mm. The thickness of the leakage preventing plate is more preferably 0.15 to 0.25 mm. By making the leakage preventing plate from polypropylene, sufficient leakage resistance can be ensured, even though the thickness thereof is reduced. Therefore, even when the installation of the leakage preventing plate requires to reduce the height of the battery accordingly, the decrease in the effective volume of the battery case can be minimized. Note that, for reducing the thickness of the leakage preventing plate as well as obtaining good resistance to leakage, a film-method synthetic paper is preferable as a material of the leakage preventing plate.

Embodiments of the present invention will now be specifically described, with reference to the drawings. FIG. 1A is an oblique view schematically illustrating a cylindrical alkaline storage battery according to one embodiment of the present invention. FIG. 1B is an enlarged cross-sectional view of an essential part of the battery of FIG. 1A. FIG. 1C is an enlarged cross-sectional view of another essential part of the battery of FIG. 1A. In FIG. 1A, for facilitating understanding of the internal structure of the battery, the battery is partially shown as a cross-sectional view.

A battery 100 is schematically illustrated, and, for example, an AA-size nickel-metal hydride storage battery. The battery 100 includes a cylindrical battery case 1 having a side wall including an opening end portion, and a bottom. The battery case 1 is formed of an electrically conductive material (e.g., metal). Within the battery case 1, an approximately columnar electrode group 11 including a positive electrode 12, a negative electrode 13, and a separator 14 is placed, together with an alkaline electrolyte (not shown). The electrode group 11 is formed by spirally winding the positive electrode 12 and the negative electrode 13, with the separator 14 interposed therebetween. The negative electrode 13 is arranged at the outermost periphery of the electrode group 11, and the negative electrode 13 at the outermost periphery is in direct contact with the inner wall surface of the battery case 1.

The above configuration allows the battery case 11 to serve as a negative external terminal of the battery 100. A gasket 2 formed of a ring-shaped insulating material (e.g., resin) is disposed inside the opening end portion of the battery case 1. The opening end portion of the battery case 1 is closed with a lid plate (sealing plate) 3 formed of an electrically conductive material (e.g. metal). The sealing plate 3 is electrically insulated from the battery case 1 via the gasket 2. A positive terminal plate 10 having a protrusion 10a is disposed on the sealing plate 3, and electrically connected to the sealing plate 3.

For reliably securing the gasket 2, a groove portion 4 is provided near the opening end portion of the side wall of the battery case 1, along the opening end portion. The groove portion 4 is formed by depressing the side wall of the battery case 1 from outside to inside. The sealing plate 3 is sandwiched at its peripheral edge portion from top and bottom by the gasket 2, and the gasket 2 is held between the side wall of the battery case 1 forming the groove portion 4 (groove-forming wall) and a curl portion 1a where the opening end portion of the battery case 1 is curled inward. The sealing plate 3 is thus secured at the opening end portion of the battery case 1.

The groove portion 4 has two opening edges 4a, two sides 4b, and a bottom 4c, as illustrated in FIG. 1B. The opening edges 4a, the sides 4b, and the bottom 4c are formed of the side wall of the battery case 1. In at least part of the groove portion 4, preferably all around the ring-shaped groove portion 4, the minimum value of the spacing (spacing L1) either between the two opening edges 4a or between the two sides 4b, or both, is within 0.2 mm. This can increase the effective volume of the battery case 1.

The sealing plate 3 has, at its center portion, a gas vent hole 8. A columnar valve member 9 made of rubber is arranged so as to close the gas bent hole 8 from the outside of the sealing plate 3. The valve member 9 is placed within a protrusion of the positive terminal plate 10, and is pushed by the inner top surface of the protrusion toward the sealing plate 3, at a predetermined pressure. In that way, in normal times, the gas vent hole 8 is hermetically closed with the valve member 9. On the other hand, when gas is generated in the battery case 1 and the internal pressure thereof is raised, the valve member 9 is compressed due to gas pressure, and the gas vent hole 8 opens to release the gas from the battery case 1. The sealing plate 3, the valve member 9, and the positive terminal 10 thus constitute a safety valve.

Disposed between one end (end near the sealing plate 3) of the electrode group 11 and the sealing plate 3 is an insulating member 16 provided with a circular slit. A positive electrode lead 15 connected to the positive electrode 12, through the slit, connects the positive electrode 12 and the sealing plate 13 to each other. This provides electrical connection between the positive terminal plate 10 and the positive electrode 12. Also between the other end (end near the bottom of the battery case 1) of the electrode group 11 and the bottom of the battery case 1, a circular insulating member 17 is disposed. The outer surface of the battery case 1, except the bottom, is covered with an outer label 6 for ensuring electrical insulation. Furthermore, a doughnut-shaped insulating plate (leakage preventing plate) 7 is disposed between the curl portion 1a and the outer label 6.

The leakage preventing plate 7 is preferably formed of a film-method synthetic paper mainly composed of polypropylene. The thickness thereof is preferably 0.05 mm to 0.3 mm. Specifically, YUPO (registered trademark) available from Yupo Corporation is suitable. The film-method synthetic paper of such material is excellent in chemical resistance and processability, and therefore, can withstand erosion by alkaline electrolyte. As a result, even when alkaline electrolyte leaks out from the gap between the inner surface of a crimp portion 23 (see FIG. 5) of the battery case 1 and the outer surface of the gasket 2, the alkaline electrolyte can stay within the space between the leakage preventing plate 7 and the sealing plate 3 (or the positive terminal plate 10), and will not leak externally.

Moreover, as illustrated in FIG. 1C, a sealant 5 is disposed between the outer peripheral surface of the ring-shaped gasket 2 and the inner surface of the opening end portion of the battery case 1, in order to prevent leakage of alkaline electrolyte. The sealant 5 includes a polyamide resin, and has a predetermined spreadability. With regard to the spreadability, a detailed description will be given hereinlater.

Examples of the alkaline electrolyte include an aqueous sodium hydroxide solution, an aqueous lithium hydroxide solution, and an aqueous potassium hydroxide solution. These may be used singly or as a mixture of two or more.

The separator 14 may be, for example, nonwoven fabric made of polyamide fiber, or nonwoven fabric made of polyolefin fiber, such as polyethylene and polypropylene, to which a hydrophilic functional group is attached.

The positive electrode 12 has a belt-shaped conductive positive electrode core material (not shown). The core material holds a positive electrode material mixture. Examples of the positive electrode core material include a foamed nickel substrate having a porous structure. When the core material is a foamed nickel substrate, the positive electrode material mixture is held within the communicating pores of the foamed nickel substrate.

The positive electrode material mixture comprises, for example, a positive electrode active material, an additive, and a binder. Examples of the positive electrode active material include, but not limited thereto, nickel hydroxide particles, and nickel hydroxide solid solution particles containing cobalt, zinc, or cadmium. Examples of the additive include a conductive agent comprising a cobalt compound. Examples of the binder include a hydrophilic or hydrophobic polymer.

The negative electrode 13 has a belt-shaped conductive negative electrode core material. The negative electrode core material holds a negative electrode material mixture. The negative electrode core material comprises a sheet-like metal material having a plurality of through-pores (not shown) in its thickness direction. Examples of such material include punched metal, a metal-powder-sintered-body substrate, expanded metal, and nickel net. Preferred among them are punched metal, and a metal-powder-sintered-body substrate formed by compacting and then sintering a metal powder.

The negative electrode material mixture, which is used in a nickel-metal hydride storage battery, includes as a negative electrode active material, hydrogen storage alloy particles capable of absorbing and releasing hydrogen, and further includes an additive such as a conductive agent, a thickener, and a binder, as needed. For convenience of explanation, a hydrogen storage alloy is also herein referred to as the negative electrode active material. The hydrogen storage alloy particles may be any one that can absorb hydrogen generated electrochemically in the alkaline electrolyte during charge, and can easily release the absorbed hydrogen during discharge. Non-limiting examples of the hydrogen storage alloy include: $AB_5$-type alloys, such as $LaNi_5$ and $MmNi_5$, where Mm is misch metal; and $AB_3$-type alloys, such as a rare earth-magnesium-nickel-based hydrogen storage alloy.

The conductive agent may be of any material that has electronic conductivity, and various electronic conductive materials can be used therefor. Examples thereof include: graphites, such as natural graphite (e.g., flake graphite), artificial graphite, and expanded graphite; carbon blacks, such as acetylene black, Ketjen black, channel black, furnace black, lamp black, and thermal black; conductive fibers, such as carbon fibers and metal fibers; metal powders, such as copper powder; and organic conductive materials, such as polyphenylene derivatives. Preferred among them are artificial graphite, Ketjen black, and carbon fibers. The above exemplified electronic conductive materials may be used singly or as a mixture of two or more. The above exemplified electronic conductive materials may be used in the form of a coating on the surface of the negative electrode active material.

In preparing the negative electrode active material by using a negative electrode material mixture paste, the thickener imparts viscosity to the negative electrode material mixture paste. For example, when the dispersion medium of the negative electrode material mixture paste is water, the thickener may be, for example, carboxymethyl cellulose (CMC) or a modified product thereof, polyvinyl alcohol, methyl cellulose, polyethylene oxide, polyacrylic acid, or polyacrylic acid salt.

The binder acts to bind the hydrogen storage alloy powder and the conductive agent to the current collector. The binder may be either of a thermoplastic resin or a thermosetting resin. Examples of the binder includes: styrene-butadiene copolymer rubber (SBR); polyolefins, such as polyethylene and polypropylene; fluorine-based polymers, such as polytetrafluoroethylene, polyvinylidene fluoride, tetrafluoroethylene-hexafluoropropylene copolymer, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, and vinylidene fluoride-perfluoromethyl vinyl ether-tetrafluoroethylene copolymer; and ethylene-acrylic acid copolymer, ethylene-methacrylic acid copolymer, ethylene-methyl acrylate copolymer, ethylene-methyl methacrylate copolymer, and $Na^+$ ion cross-linked products of these ethylene-(meth)acrylic acid copolymers. These may be used singly or as a mixture of two or more.

Figure 7:
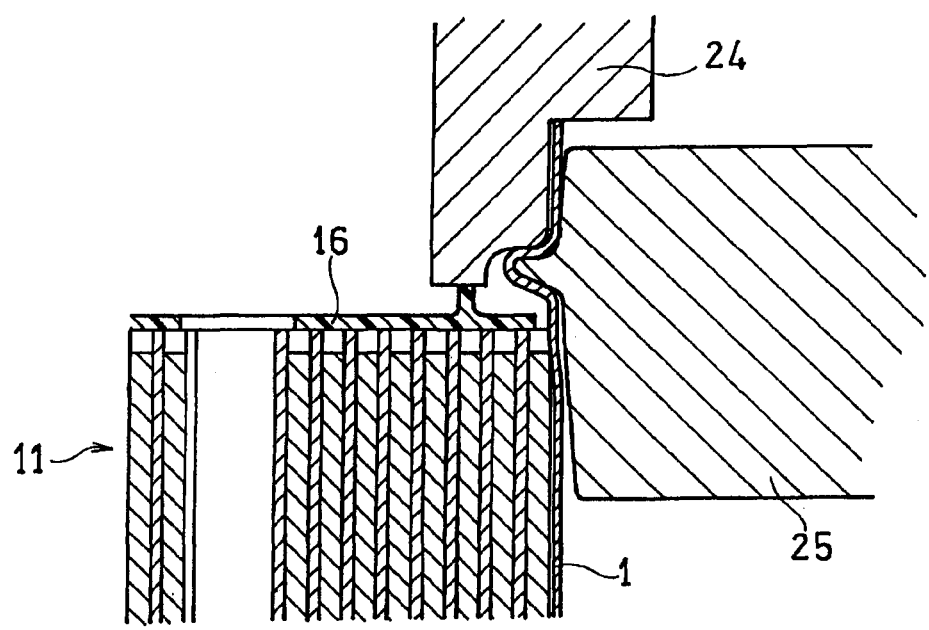

Next, a method of producing the battery 100 will be described. As illustrated in FIG. 7, the groove portion 4 can be formed using a grooving inner die 24 and a grooving roller 25, after the electrode group 11 is housed in the battery case 1. The sealing plate 3 with the gasket 2 disposed around its periphery is inserted at the opening end portion of the battery case 1 provided with the groove portion 4. The valve member 9 is placed on the gas vent hole 8 of the sealing plate 3. The positive terminal plate 10 is placed thereon from above the valve member 9, and the peripheral edge portion of the positive terminal plate 10 is welded to the top surface of the sealing plate 3. The side wall of the opening end portion of the battery case 1 is curled inward, to form the curl portion 1a. The peripheral edge portion of the sealing plate 3 is sandwiched and pressed between the curl portion 1a and the groove portion 4, with the gasket 2 therebetween, to form the crimp portion 23. At this time, a flat portion 1b (see FIG. 1C) is formed between the curl portion 1a and the groove portion 4 constituting the crimp portion 23. In other words, the crimp portion 23 includes the curl portion 1a, the groove portion 4, and the flat portion 1b. The width L4 of the flat portion 1b is preferably 1.4 to 4 times as large as the thickness L3 of the peripheral edge portion of the sealing plate.

Furthermore, as illustrated in FIG. 2, to the groove portion 4 of an unfinished battery 29, groove-width compression processing is applied using a groove-width compressing lower die 26, a groove-width compressing guide 27, and a groove-width compressing upper die 28. In the groove-width compression processing, the groove-width compressing upper die 28 applies pressure to the curl portion 23, so as to squeeze the groove portion 4 from top and bottom. This processing decreases the width of the groove portion 4, and thus can increase the effective volume of the battery case 1. At this time, the groove width is compressed such that the minimum spacing Lm1 is preferably within 0.2 mm all around the groove portion 4. The groove-width compression processing may be performed so as to press-fit the opening edges 4a of the groove portion 4 together and/or the sides 4b of the groove portion 4 together. In this case, the minimum spacing Lm1 is zero all around the groove portion 4.

Moreover, the battery case 1 can be formed using a battery case which is, for example, 0.5 to 2.5% larger than the design size. And, diameter reduction processing to reduce the diameter to the design size after the electrode group 11 and electrolyte are housed in the battery case 1 can be performed. There are two purposes of applying the diameter reduction processing to a cylindrical alkaline storage battery.

The first purpose is to prevent a crack or break in the battery case 1 when inserting the electrode group 11 into the battery case 1. To insert the electrode group 11 which is tightly wound for a higher capacity into the battery case 1, it suffices if the battery case 1 has an inner diameter larger than the outer diameter of the electrode group 11. However, in order to reduce the outer diameter of the battery case 1 to the design size, it is necessary to apply the diameter reduction processing to the battery case 1 after the electrode group 11 is inserted into the battery case 1.

The second purpose is to allow an alkaline electrolyte to penetrate into the electrode group 11 in a short time when injecting the alkaline electrolyte into the battery case 1 after the electrode group 11 is inserted therein. Alkaline electrolyte is difficult to penetrate into the tightly-wound electrode group 11. However, by inserting the electrode group into the battery case 1 having an inner diameter larger than the electrode group 11 first, and then injecting the electrolyte thereinto, the electrolyte can quickly penetrate into the electrode group 11. Note that, in order to reduce the outer diameter of the battery case 1 to the design size, it is necessary to apply the diameter reduction processing to the battery case 1 after the electrode group 11 and the alkaline electrolyte are inserted into the battery case 1.

Before grooving processing is applied to the battery case 1, the diameter reduction processing can be performed, as illustrated in FIG. 4, by using a diameter-reducing upper die 30 and a diameter-reducing lower die 32 so that only a portion corresponding to the crimp portion of an unfinished battery 31 is reduced in diameter. Alternatively, the diameter reduction processing may be performed after grooving and crimping, as illustrated in FIGS. 5 and 6, by sliding a diameter-reducing die 20 in the axis direction of the battery case 1.

In the diameter reduction processing as illustrated in FIGS. 5 and 6, the diameter reduction processing may be applied to both a body portion 22 and the crimp portion 23. At this time, the size (inner diameter LX, not shown) of the die, the outer diameter (LY, not shown) of the body portion of the battery case, and the outer diameter (LZ, not shown) of the crimp portion have the relationship: $LX \leq LY$ and $LX \leq LZ$. Alternatively, the diameter reduction processing may be applied only to the body portion 22. Here, $LX \leq LY$ and $LX > LZ$. Alternatively, the diameter reduction processing may be applied only to the crimp portion 23. Here, $LX > LY$ and $LX \leq LZ$.

When the diameter reduction processing is performed after grooving and crimping, the deformation amount of a region WA (see FIG. 8) where the battery case 1 faces the gasket 2 with the sealant 5 therebetween reaches 2 mm at most. Therefore, the sealant 5 is required to have spreadability that allows to maintain a large stress even at the above deformation amount. A test method for evaluating the spreadability of the sealant 5 will be described below.

In general, the sealant property is evaluated in accordance with the "adhesive-rigid adherend tensile/shear bond strength test method" specified in JIS/K6850 (1999). The present inventors have examined properties of various sealants by this test method. They found, however, that even with a sealant exhibiting a high bond strength in this test method, leakage occurs at times in a cylindrical nickel-metal hydride battery to which the diameter reduction processing and the groove-width compression processing are applied, after the battery is subjected to a predetermined climate-temperature cycle test.

Based on the finding, with regard to sealants having various strength properties, the present inventors have examined whether leakage occurs or not in a cylindrical nickel-metal hydride battery having subjected to diameter reduction processing and groove-width compression processing. As a result, they found that a sealant exhibiting good spreadability at an excessively large deformation amount about 2.5 times as large as the above-described maximum deformation amount (2 mm) can be suitably used as the sealant 5. In the diameter reduction processing, stress is applied in the diameter direction; in the width-compression processing, stress is applied in the longitudinal direction (axis direction of the battery case 1). Since the direction of stress applied is not unidirectional, it is considered suitable to use a sealant exhibiting good spreadability at an excessively large deformation amount larger than the maximum value of the actual deformation amount of the battery case 1. In short, in the conventional test method as mentioned above, the tensile/shear bond strength is measured quasi-statically. Satisfactory results would not be obtained, if such a test method is applied to the deformation of the battery case which undergoes non-unidirectional stress, and the sealant is evaluated merely from a predicted maximum deformation amount of the battery case. The present invention has a technical significance in evaluating the spreadability of the sealant at an excessively large deformation amount which is about 2.5 times as large as a predicted maximum deformation amount of the battery case.

Figure 3:
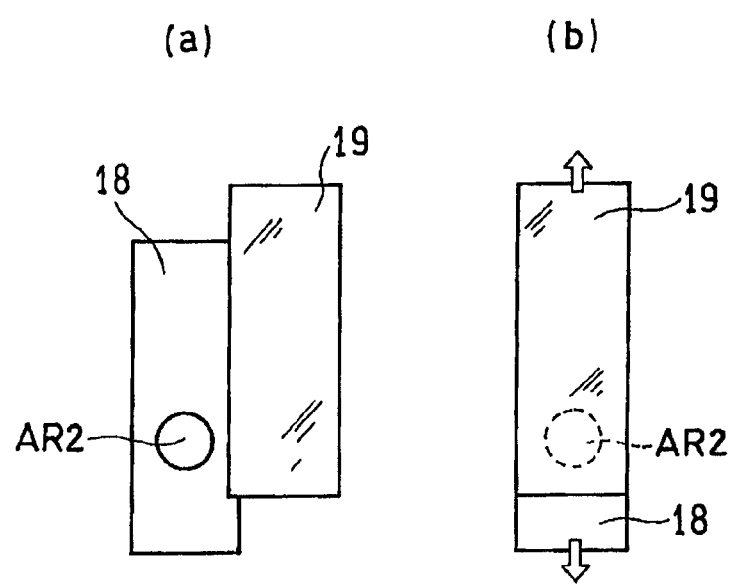

Specifically, sealing property of the sealant can be evaluated from the stress measured by the method as illustrated in FIG. 3.

First, as illustrated in FIG. 3(a), on a first sheet 18 (one of two test-plate materials), 6 mg (weight excluding solvent) of the material of the sealant is applied within a circle (region AR2) of 10 mm in diameter, to form a bonding portion. Subsequently, as illustrated in FIG. 3(b), a second sheet 19 (the other of the two test-plate materials) is bonded onto the first sheet 18. Then, the two sheets are pulled in opposite directions, as shown by the arrows. The relative displacement amount between the second sheet 19 and the first sheet 18 and the load are measured, to determine a stress applied to the bonding portion when the relative displacement amount is from 0.5 to 5 mm (hereinafter referred to as "bonding-portion stress"). By employing such a test method, in which the area where the sealant 5 is applied is larger than the actual application area, the spreadability of the sealant when the relative displacement amount between two test-plate materials is from 0.5 to 5 mm can be evaluated.

More specifically, spreadability of the sealant can be evaluated by the following method.

First, a nickel-plated steel sheet of 20×60 mm in size and a nylon sheet of the same size are prepared as the first sheet 18 and the second sheet 19, respectively. Specifically, the first sheet 18 is a 0.4-mm-thick nickel-plated steel sheet with both sides plated in 3 μm thick. The second sheet 19 is a 0.7-mm-thick 6,6-nylon sheet. Note that the surfaces of both sheets are degreased in advance with acetone. The sealant is diluted with a solvent to a viscosity of about 500 mPa·sec. The sealant solution is uniformly applied in an amount equivalent to 6 mg in dry weight to the region AR2 of the first sheet 18, followed by natural drying for 15 minutes, thereby to form a bonding portion.

Next, the second sheet 19 is bonded onto the first sheet 18 at the bonding portion, and then, a load is applied thereto with a weight of 15 kg for 24 hours. Subsequently, the ends of the both sheets bonded together at the bonding portion are pinched with a tensile and compression testing machine (e.g., TG-5 kN (model number) available from Minebea Co., Ltd.), and pulled in the direction horizontal to the sheet surface at a moving speed of 10 mm/min. At this time, the above relative displacement amount and the load are measured, to determine a bonding-portion stress. The measurement is performed until the relative displacement amount reaches a predetermined value (e.g., 40 mm), or the bonding-portion stress becomes 0 (zero).

The sealant may be of any material that is formed such that a stress equal to or greater than a predetermined value (0.02 N/mm$^2$) is applied to the bonding portion while the relative displacement amount is within a predetermined range (0.5 to 5 mm). For example, when the sealant 5 is of a material mainly composed of a polyamide resin, it preferably has an amine value of 45 to 150.

The side wall of the battery case 1, except the portion forming the groove portion, preferably has a thickness of 0.14 mm or less, in view of achieving a higher capacity. The groove-forming wall preferably has a thickness of 0.19 mm or less. However, in the case of applying the groove-width compression processing, due to the necessity of preventing buckling of the battery case 1, at least the thickness of the side wall of the battery case 1 except the portion forming the groove is preferably 0.09 mm or more. In addition, to prevent the gasket 2 from slipping off from the groove portion 4 during the groove-width compression processing, the groove-forming wall preferably projects 0.3 mm or more inward of the battery case 1 than the other portion. For the similar reason, the thickness of the groove-forming wall is preferably 0.17 mm or more.

EXAMPLE

Examples of the present invention will now be described. The present invention, however, should not be limited to these Examples.

AA-size cylindrical nickel-metal hydride storage batteries of Examples and Comparative Examples as shown below were fabricated, and evaluated for the following items (1) and (2).

(1) Evaluation regarding the tensile/shear bond strength of a material used as the sealant (2) Evaluation on resistance to leakage For evaluation, 100 cylindrical nickel-metal hydride storage batteries were prepared. The batteries were divided into two groups, 50 batteries each. The two groups of batteries were respectively subjected to two different charge/discharge processes differing in the number of charge/discharge cycles. Specifically, for one group of batteries, a charge/discharge process was performed 10 times in total in which the batteries were charged at a current value of 0.1 It(A) for 16 hours, and then discharged at a current value of 0.2 It(A) to a discharge cut-off voltage of 1.0 V, while the discharge capacity was measured. For the other group of batteries, the same charge/discharge process was preformed 150 times in total. The purpose of varying the number of times of charge/discharge process is as follows. In a cylindrical nickel-metal hydride storage battery, the ability of the negative electrode to absorb oxygen produced during charge is reduced as the number of times of charge and discharge is increased, and thus the internal pressure is raised. Therefore, by varying the number of times of charge/discharge process between two groups of batteries, the leakage resistance can be evaluated with respect to two groups of batteries differing in internal pressure.

Furthermore, with respect to the above two groups of batteries, a climate-temperature cycle test ranging from −20 to 70° C. was preformed, and the presence or absence of leakage was visually checked at the 10$^{th}$ cycle. Note that this test is in accordance with 6.2.2.4 (Test C) of JIS standard C8514 and IEC standard 60086-5.

Example 1

A 0.35-mm-thick nickel-plated steel plate was press-worked into a bottom-closed cylindrical battery case 1 of 51.4 mm in height and 14.25 mm in outer diameter in which the thickness of a portion within 7 mm from the rim was 0.19 mm, the thickness of a portion between 7 mm to 12 mm from the rim was thinner stepwise from 0.19 mm to 0.09 mm, and the thickness of a portion 12 mm or more below the rim was 0.09 mm.

A paste containing nickel hydroxide particles, cobalt oxide particles, and a binder was prepared. The paste was packed into a foamed nickel substrate, and the substrate was dried, and then roll-pressed and cut. A positive electrode was thus produced.

An ingot of AB$_5$-type hydrogen storage alloy represented by $Mm_{1.0}Ni_{4.0}Co_{0.4}Mn_{0.3}Al_{0.3}$, where Mm represents misch metal, was mechanically crushed and sieved, to give hydrogen storage alloy particles. The hydrogen storage alloy particles were mixed with polytetrafluoroethylene, polyacrylic acid soda, and carboxymethylcellulose serving as binders, carbon black serving as a conductive agent, and water, to prepare a slurry. The slurry was applied onto a punched metal, and the punched metal was dried, and then roll-pressed and cut. A negative electrode was thus produced.

The negative and positive electrodes thus produced were wound, with a 0.12-mm-thick polyamide separator treated with sulfuric acid interposed therebetween, into an electrode group.

After the electrode group and an insulating member were housed in the battery case, a groove portion was formed using a grooving inner die 24 and a grooving roller 25 as illustrated in FIG. 7. The projecting height of the groove-forming wall in the inward direction of the battery case was set to 1 mm.

Figure 8:
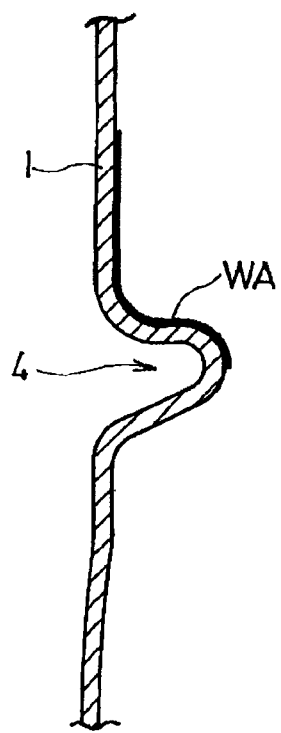

A sealant mainly composed of polyamide and having an amine value of 99 was uniformly applied onto a sealant application region WA, which extends above the groove portion as illustrated in FIG. 8, of the inner surface of the battery case. More specifically, the sealant used here was a compound A being a polyamide resin formed through condensation reaction of triamine and a dimer acid having 20 to 32 carbon atoms. The compound A was diluted with toluene to a viscosity of about 500 mPa·sec.

An alkaline electrolyte was diluted with ion exchange water so that it had a sodium hydroxide concentration of 4.4 mol/L, and a potassium hydroxide concentration of 1.1 mol/L. Then, 2.38 g of the electrolyte was injected into the battery case, and allowed to penetrate into the electrode group under reduced pressure.

After the opening end portion of the battery case was crimped, diameter reduction processing was applied using a diameter-reducing die 20, as illustrated in FIG. 6, so that the outer diameters of a body portion 22 and a crimp portion 23 of the battery case 1 were reduced to 14 mm. The width of a flat portion between the curl and groove portions of the crimp portion 23 was set to 1 mm, which was two times as large as the thickness (0.5 mm) of the sealing plate. After crimping, groove-width compression processing was applied to an unfinished battery 29 using a groove-width compressing guide 27, a groove-width compressing upper die 28, and a groove-width compressing lower die 26, so that the minimum spacing Lm1 was within 0.1 mm all around the groove portion.

A 0.2-mm-thick doughnut-shaped leakage preventing plate formed of YUPO (registered trademark) was placed on the curl portion of the battery case so that the entire peripheral edge portion thereof came in contact with the curl portion, and the hole provided at the center thereof came completely in contact with a protrusion 10a of a positive terminal plate 10. The side surface of the battery case and the peripheral edge portion of the leakage preventing plate were covered with an outer label. A cylindrical nickel-metal hydride storage battery was thus fabricated.

Example 2

A cylindrical nickel-metal hydride storage battery was fabricated in the same manner as in Example 1, except that a compound B being a polyamide resin formed through condensation reaction of triamine and a dimer acid having 36 to 45 carbon atoms was used as the material of the sealant.

Comparative Example 1

A cylindrical nickel-metal hydride storage battery was fabricated in the same manner as in Example 1, except that a compound C being blown asphalt was used as the material of the sealant.

Comparative Example 2

A cylindrical nickel-metal hydride storage battery was fabricated in the same manner as in Example 1, except that a compound D being polybutene was used as the material of the sealant.

Figure 9:
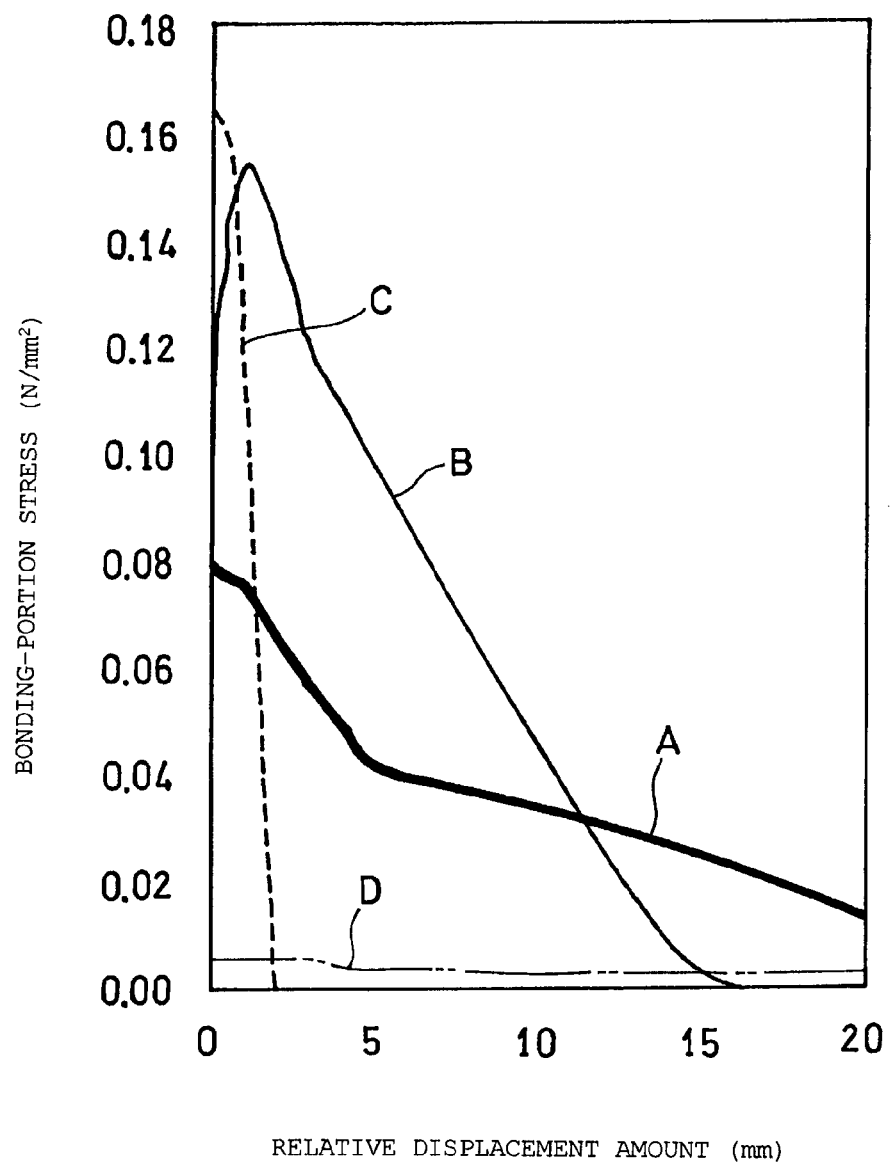

FIG. 9 is a graph obtained by plotting the bonding-portion stress of the sealants composed of the compounds A to D, against the relative displacement amount.

Example 3

A cylindrical nickel-metal hydride storage battery was fabricated in the same manner as in Example 1, except that a compound E prepared by mixing the compounds A and C in a weight ratio of 7:3 was used as the material of the sealant.

Comparative Example 3

A cylindrical nickel-metal hydride storage battery was fabricated in the same manner as in Example 1, except that a compound F prepared by mixing the compounds A and C in a weight ratio of 5:5 was used as the material of the sealant.

Example 4

A cylindrical nickel-metal hydride storage battery was fabricated in the same manner as in Example 1, except that the groove-width compression processing was applied so that the minimum spacing Lm1 was within 0.2 mm all around the groove portion.

Comparative Example 4

A cylindrical nickel-metal hydride storage battery was fabricated in the same manner as in Example 1, except that the groove-width compression processing was applied so that the minimum spacing Lm1 was within 0.22 mm all around the groove portion. The results of the foregoing are summarized in Table 1.

TABLE 1

| | | Lm1 (mm) | Bonding-portion stress (N/mm$^2$) | | | Leakage occurrence percentage Climate-temperature cycle test (10 cycles) | |
|---|---|---|---|---|---|---|---|
| | | | Max. | Relative displacement amount | | Number of times of charge and discharge | Number of times of charge and discharge |
| | Sealant | | | 0.5 mm | 5 mm | 10 times | 150 times |
| Ex. 1 | Compound A | 0.1 | 0.079 | 0.077 | 0.041 | 0% | 0% |
| Ex. 2 | Compound B | 0.1 | 0.154 | 0.146 | 0.097 | 0% | 0% |
| Com. Ex. 1 | Compound C | 0.1 | 0.172 | 0.153 | 0 | 40% | 100% |
| Com. Ex. 2 | Compound D | 0.1 | 0.005 | 0.005 | 0.003 | 20% | 70% |
| Ex. 3 | Compound E | 0.1 | 0.054 | 0.031 | 0.02 | 0% | 0% |
| Com. Ex. 3 | Compound F | 0.1 | 0.022 | 0.019 | 0.002 | 30% | 80% |
| Ex. 4 | Compound A | 0.2 | 0.079 | 0.077 | 0.041 | 0% | 0% |
| Com. Ex. 4 | Compound A | 0.22 | 0.079 | 0.077 | 0.041 | 0% | 0% |

Table 1 shows that no leakage occurred in Examples 1, 2 and 3. This is presumably because, as shown in FIG. 9, the sealants of Examples 1, 2 and 3 (compounds A, B and E) maintained sufficient bonding-portion stress, even against the excessive relative displacement amount of 5 mm.

On the other hand, leakage occurred in Comparative Examples 1, 2 and 3. As shown in FIG. 9, the sealant of Comparative Example 1 (compound C) was high in tensile/shear bond strength (maximum stress exerted until the bonding portion sheared off) but lacked in elasticity (was fragile), which presumably led to leakage. The sealant in Comparative Example 2 (compound D) was a highly viscous compound with stringy property, but did not maintain sufficient bonding-portion stress, against the excessive relative displacement amount of 5 mm, which presumably led to leakage. In Comparative Example 3, since blown asphalt was blended with the polyamide resin in a ratio of 5:5 by weight, the bonding-portion stress at the excessive relative displacement amount of 5 mm was lowered, which presumably led to leakage.

In Example 4 in which the minimum spacing L1 was set to 0.2 mm at maximum, no leakage occurred like in Example 1. In contrast, in Comparative Example 4 in which the minimum spacing L1 was set to 0.22 mm at maximum, no leakage occurred, but the effective volume of the battery case 1 was not sufficient, and a predetermined amount of active material was not packed.

The above results show that it is possible to improve the leakage resistance of a cylindrical alkaline storage battery as well as to achieve a higher capacity by using a sealant mainly composed of polyamide resin that exhibits a bonding-portion stress 0.02 N/mm$^2$ or more when the relative displacement amount is from 0.5 to 5 mm, and setting the minimum spacing Lm1 within 0.2 mm.

Next, compounds A and G to J mainly composed of polyamide resins having different amine values were prepared by blending diamine, triamine, and tetramine, as appropriate, with a dimer acid having 20 to 32 carbon atoms, to cause a condensation reaction therebetween. Here, the higher the blending ratio of diamine is, the lower the amine value of the resultant polyamide resin is; the higher the blending ratio of tetramine is, the higher the amine value is. In this way, the compound G having an amine value of 30, the compound H having an amine value of 45, the compound A having an amine value of 99, the compound I having an amine value of 150, and the compound J having an amine value of 230 were prepared. The compounds A and G to J were diluted with toluene to a viscosity of about 500 mPa·sec. Cylindrical nickel-metal hydride storage batteries were fabricated in the same manner as in Example 1, except for using the prepared compounds as the sealants, and were evaluated for leakage resistance. The results are shown in Table 2.

TABLE 2

| | Sealant (polyamide resin) | Amine value | Bonding-portion stress (N/mm$^2$) | | | Leakage occurrence percentage Climate-temperature cycle test (10 cycles) | |
|---|---|---|---|---|---|---|---|
| | | | Max. | Relative displacement amount | | Number of times of charge and discharge | Number of times of charge and discharge |
| | | | | 0.5 mm | 5 mm | 10 times | 150 times |
| Com. Ex. 5 | Compound G | 30 | 0.177 | 0.171 | 0 | 30% | 70% |
| Ex. 5 | Compound H | 45 | 0.142 | 0.139 | 0.025 | 0% | 0% |
| Ex. 1 | Compound A | 99 | 0.079 | 0.077 | 0.041 | 0% | 0% |
| Ex. 6 | Compound I | 150 | 0.067 | 0.059 | 0.035 | 0% | 0% |
| Com. Ex. 6 | Compound J | 230 | 0.024 | 0.023 | 0.017 | 10% | 50% |

As shown in Table 2, no leakage occurred when the amine value was in the range of 45 to 150 (Examples 1, 5 and 6).

On the other hand, when the amine value was below 45 (Comparative Example 5), although the tensile/shear bond strength was extremely high, the desired bonding-portion stress was not maintained when the relative displacement amount was 5 mm. This led to leakage. When the amine value was above 150 (Comparative Example 6), a high viscosity was exhibited, but presumably due to a lack of the bonding-portion stress at the relative displacement amount being 5 mm, leakage occurred.

The above results show that when the sealant includes a polyamide resin, excellent leakage resistance can be maintained as long as the amine value thereof is in the range of 45 to 150.

For achieving a higher capacity, in a cylindrical alkaline storage battery, it is preferable to compress the groove portion, thereby to increase the effective volume. In view of this, the thickness of the side wall of the battery case, and the projecting height of the groove portion in the inward direction of the battery case were evaluated. Specifically, four different battery cases were prepared in which the thickness of the side wall of the battery case except the portion forming the groove portion (hereinafter referred to as a "thickness of the portion except the groove-forming wall") was different, 0.07 mm, 0.09 mm, 0.14 mm, and 0.16 mm. In addition, with the thickness of the portion except the groove-forming wall unchanged at 0.09 mm, the projecting height of the groove portion in the inward direction of the battery case (hereinafter referred to as "groove-projecting height") was varied to four different heights: 0.2 mm, 0.3 mm, 1 mm, and 1.7 mm. The batteries were fabricated in the same manner as in Example 1, except the above.

Table 3 shows the results of appearance inspection of the batteries differing in the thickness of the side wall of the battery case and the projecting height of the groove portion in the inward direction of the battery case.

TABLE 3

| | Thickness of portion except groove-forming wall (mm) | Groove-projecting height (mm) | Appearance defect occurrence percentage | |
|---|---|---|---|---|
| | | | Buckling | Gasket slipping-off |
| Ex. 7 | 0.07 | 1 | 4% | 0% |
| Ex. 1 | 0.09 | | 0% | 0% |
| Ex. 8 | 0.14 | | 0% | 0% |
| Ex. 9 | 0.16 | | 0% | 0% |
| Ex. 10 | 0.09 | 0.2 | 0% | 2% |
| Ex. 11 | | 0.3 | 0% | 0% |
| Ex. 12 | | 1.7 | 0% | 0% |

As shown in Table 3, in Example 7 in which the thickness of the portion except the groove-forming wall was 0.07 mm, 4% buckling occurred; in Examples 1, 8 and 9 in which the thickness was in the range of 0.09 to 0.16 mm, no buckling occurred. In Example 9 in which the thickness was 0.16 mm, no buckling occurred, but the effective volume was not sufficient, and a predetermined amount of active material was not packed. The foregoing results show that, with regard to the thickness of the portion except the groove-forming wall, a more preferable range is from 0.09 to 0.14 mm. In Example 10 in which the groove-projecting height was 0.2 mm, in 2% of the batteries, the gasket slipped downward from the groove portion. In contrast, in Examples 11 and 12 in which the groove-projecting heights were 0.3 mm and 1.7 mm, respectively, no slipping-off of the gasket from the groove portion occurred. The foregoing results show that, with regard to the groove-projecting height, a more preferable range is 0.3 mm or more.

In the case where the diameter reduction processing is performed after crimping, and is applied to both the body portion and the crimp portion, the difference between the outer diameters of the body portion and the crimp portion (flat portion) becomes within 0.06 mm. Without diameter reduction processing, the difference exceeds 0.06 mm due to a difference in the density of the positive or negative electrode constituting the electrode group, and in the material of the gasket. The diameter reduction processing forms a flat portion between the curl and groove portions of the crimp portion. When the diameter reduction processing is performed on the battery having subjected to crimp processing, the gasket compressibility is lowered, or a gap is created between the battery case and the gasket, leading to easy leakage of alkaline electrolyte. In view of this, five different batteries were prepared which differs in the width L4 of the flat portion of the crimp portion, relative to the thickness L3 of the outermost periphery of the sealing plate (L4=1.4×L3, 2×L3, 3×L3, 4×L3, and 4.2×L3), by changing the dimensions of the diameter-reducing die, the time duration of the diameter reduction processing, and the number of times of processing. The batteries were fabricated in the same manner as in Example 1, except the above.

Table 4 shows the leakage resistance evaluation results of various cylindrical alkaline storage batteries differing in the width of the flat portion.

TABLE 4

| | Ratio of flat portion width L4 to L3 (L4/L3) | Leakage occurrence percentage Climate-temperature cycle test (10 cycles) | |
|---|---|---|---|
| | | Number of times of charge and discharge 10 times | Number of times of charge and discharge 150 times |
| Ex. 13 | 1.4 | 0% | 0% |
| Ex. 14 | 2 | 0% | 0% |
| Ex. 15 | 3 | 0% | 0% |
| Ex. 16 | 4 | 0% | 0% |
| Ex. 17 | 4.2 | 0% | 2% |

As shown in Table 4, in Examples 13, 14, 15 and 16 in which the ratio L4/L3 was in the range of 1.4 to 4, no leakage occurred. On the other hand, in Example 17 in which the ratio L4/L3 was 4.2, 2% leakage occurred when the number of times of charge and discharge was 150. With regard to the batteries in which the ratio exceeded 4.0, presumably, the gasket compressibility was low, and the battery case and the gasket had a gap therebetween, which reduced the leakage resistance. The foregoing results show that the width L4 of the flat portion formed in the crimp portion is preferably 1.4 to 4 times as large as the thickness L3 of the peripheral edge portion of the sealing plate.

With regard to the lower limit value of the width of the flat portion, due to the presence of the gasket 2 on top and bottom of the peripheral edge portion of the sealing plate 3, it is difficult to reduce the width of the flat portion to be 1.4×L3 or less.

In the case where the opening end portion where a crimp portion is to be formed is reduced in diameter after insertion of the electrode group into the battery case and before crimping (see FIG. 4), the inner surface of the crimp portion of the battery case will have a higher surface roughness than the inner surface of the body portion, leading to easy leakage of alkaline electrolyte. In view of this, batteries in which R2 was 1.2 times, 2 times, 4 times, 6 times, and 6.2 times as large as R1 were produced, by changing the dimensions of the diameter-compressing upper die 30, in the same manner as in Example 1 expect the above. Here, "R1" represents the maximum height of surface roughness ($R_{max}$) of the inner surface of the body portion 22 of the battery case 1 of an unfinished battery 31, and "R2" represents the maximum height of surface roughness ($R_{max}$) of the inner surface of the crimp portion of the battery case.

Table 5 shows the leakage resistance evaluation results of cylindrical alkaline storage batteries differing in the surface roughness of the inner surface of the crimp portion of the battery case.

TABLE 5

| | Ratio of maximum height of surface roughness of inner surface of crimp portion (R2/R1) | Leakage occurrence percentage Climate-temperature cycle test (10 cycles) | |
|---|---|---|---|
| | | Number of times of charge and discharge 10 times | Number of times of charge and discharge 150 times |
| Ex. 18 | 1.2 | 0% | 0% |
| Ex. 19 | 2 | 0% | 0% |
| Ex. 20 | 4 | 0% | 0% |
| Ex. 21 | 6 | 0% | 0% |
| Ex. 22 | 6.2 | 0% | 6% |

As shown in Table 5, in Examples 18, 19, 20 and 21 in which the ratio R2/R1 was in the range of 1.2 to 6, no leakage occurred. In contrast, in Example 22 in which the ratio R2/R1 was 6.2, 2% leakage occurred when the number of times of charge and discharge was 150. Presumably, in Example 22, the outer diameter was reduced too much by diameter reduction, increasing the surface roughness of the inner surface of the crimp portion. As a result, a gap was created between the battery case and the gasket, which reduced the leakage resistance.

On the other hand, when the opening end portion of the battery case where a crimp portion is to be formed is reduced in diameter by the method as illustrated in FIG. 4, the ratio R2/R1 cannot be lowered to 1.2 or less.

Figure 10:
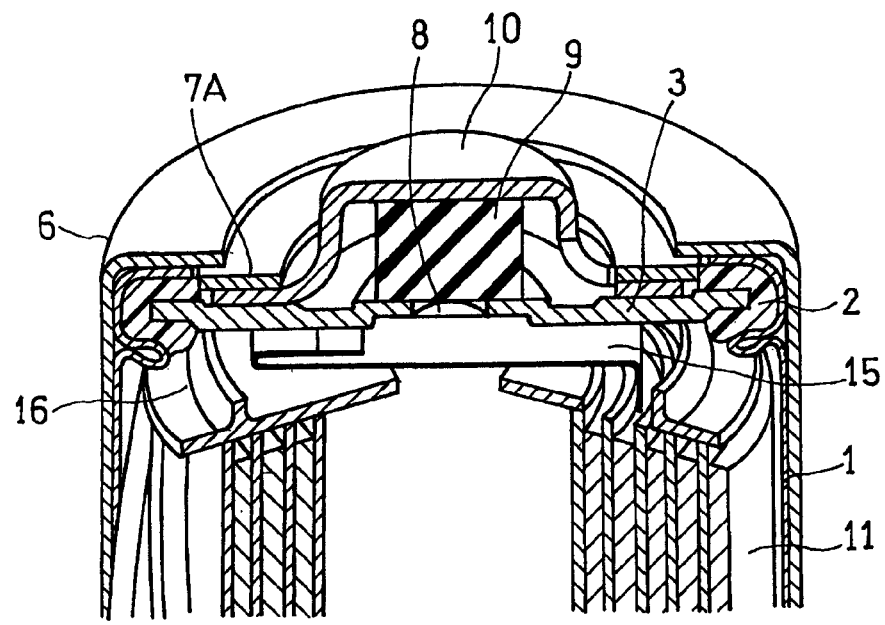
Figure 11:
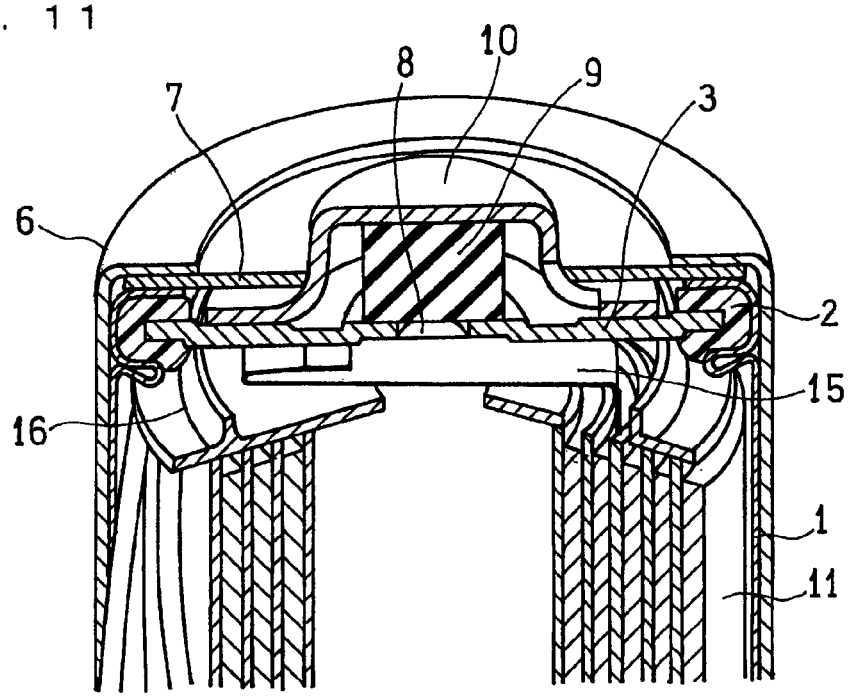

In FIG. 10, for preventing shorting between the positive electrode 10 and the battery case 1, a doughnut-shaped insulating plate 7A is disposed between the positive terminal 10 and the battery case 1. The insulating plate 7A, which does not involve a decrease in the battery internal volume, can be arranged between the rim of the curl portion and the protrusion 10a of the positive terminal 10. Batteries including the insulating plate 7A and batteries including the leakage preventing plate 7 (see FIG. 11) were produced in the manner similar to that in Example 1.

Table 6 shows the leakage resistance evaluation results of cylindrical alkaline storage batteries, using the insulating plate 7A and the leakage preventing plate 7 each having a thickness of 0.20 mm.

TABLE 6

|  |  | Leakage occurrence percentage Climate-temperature cycle test (10 cycles) | | |
| --- | --- | --- | --- | --- |
|  |  | Number of times of charge and discharge 10 times | Number of times of charge and discharge 150 times | Number of times of charge and discharge 500 times |
| Ex. 1 | Leakage preventing plate 7 included | 0% | 0% | 0% |
| Ex. 23 | Insulating plate 7A included | 0% | 0% | 8% |

As shown in Table 6, in both the batteries including the leakage preventing plate 7 (Example 1) and the batteries including the insulating plate 7A (Example 23), no leakage occurred when the number of times of charge and discharge was 150. After 500 times of charge and discharge, the outer label, the leakage preventing plate, and the insulating plate were removed from each battery, to check the battery for leakage. Leakage was observed in 8% of the batteries in Example 23. The foregoing results show that by installing the leakage preventing plate 7, even when the alkaline electrolyte leaks out, the leaked electrolyte can stay in the space between the leakage preventing plate 7 and the sealing plate 3, and leakage to the exterior can be delayed.

The foregoing results also show that by using a film-method synthetic paper mainly composed of polypropylene, which is excellent in chemical resistance and processability, as a material of the leakage preventing plate 7, the thickness can be reduced, and the battery internal volume can be minimized even when the leakage preventing plate 7 is included.

It is to be noted that although nickel-metal hydride storage batteries were used as the cylindrical alkaline storage batteries in the aforementioned Examples, nickel-cadmium storage batteries can be used with similar results.

INDUSTRIAL APPLICABILITY

The present invention is useful for alkaline storage batteries for which a higher capacity is achieved without sacrificing the leakage resistance.

REFERENCE SIGNS LIST

1 Battery case
2 Gasket
3 Sealing plate
4 Groove portion
5 Sealant
6 Outer label
7 Leakage preventing plate
8 Gas vent hole
9 Valve member
10 Positive terminal
11 Electrode group
12 Positive electrode
13 Negative electrode
14 Separator
15 Positive electrode lead
16 Insulating member
17 Insulating member
18 First sheet
19 Second sheet
20 Diameter-reducing die
21 Bottom of battery case
22 Body portion of battery case
23 Curl portion
24 Grooving inner die
25 Grooving roller
26 Groove-width compressing lower die
27 Groove-width compressing guide
28 Groove-width compressing upper die
29, 31 Unfinished battery
30 Diameter-reducing upper die
31 Diameter-reducing lower die

The invention claimed is:
1. A cylindrical alkaline storage battery comprising:
an electrode group including a positive electrode, a negative electrode, and a separator;
an alkaline electrolyte;
a cylindrical battery case having: a side wall including an opening end portion; and a bottom, the battery case accommodating the electrode group and the electrolyte, and being connected to one of the positive electrode and the negative electrode;
a sealing plate for sealing the opening end portion;
an external terminal plate having a protrusion, the external terminal plate being arranged in contact with the sealing plate, and connected to the other one of the positive electrode and the negative electrode via the sealing plate;

a gasket interposed between a peripheral edge portion of the sealing plate and an inner surface of the opening end portion; and a sealant for providing sealing between the gasket and the inner surface of the opening end portion, the side wall having: an annular groove portion that is open at an outer surface of the side wall, the groove portion being formed along the opening end portion so as to be adjacent to the opening end portion; and a curl portion where the opening end portion is curled inward;

the curl portion, together with the side wall at a portion forming the groove portion, sandwiching the peripheral edge portion of the sealing plate to secure the sealing plate at the opening end portion of the battery case;

in at least part of the groove portion, a minimum value of a groove width L1 being within 0.2 mm;

the sealant including a polyamide resin, the sealant being formed such that when two test-plate materials are bonded together at bonding faces that face each other via a bonding portion forming of the sealant, and moved in parallel with the bonding faces and in opposite directions under a condition that a relative displacement amount is within a range of 0.5 to 5 mm, a stress at least 0.02 N/mm² is applied to the bonding portion.

2. The cylindrical alkaline storage battery according to claim 1, wherein the polyamide resin has an amine value greater than or equal to 45 and less than or equal to 150.

3. The cylindrical alkaline storage battery according to claim 1, wherein the side wall, except the portion forming the groove portion, has a thickness of 0.09 to 0.14 mm, and the side wall at the portion forming the groove portion has a projecting height in an inward direction of the battery case of 0.3 mm or more.

4. The cylindrical alkaline storage battery according to claim 1, wherein:

the side wall has a flat portion between the curl portion and the groove portion, the flat portion having a width 1.4 to 4 times as large as a thickness of the peripheral edge portion of the sealing plate; and a difference between an outer diameter of the flat portion and an outer diameter of a body portion of the side wall is within 0.06 mm, the body portion being a portion of the side wall other than the curl portion, the groove portion, and the flat portion.

5. The cylindrical alkaline storage battery according to claim 1, wherein a maximum height of surface roughness ($R_{max}$) of an inner surface of the side wall in a portion from the curl portion to the groove portion is 1.2 to 6 times as large as a maximum height of surface roughness ($R_{max}$) of the inner surface of the side wall in a portion other than the portion from the curl portion to the groove portion.

6. The cylindrical alkaline storage battery according to claim 1, further comprising a doughnut-shaped leakage preventing plate having at a center portion a hole through which the protrusion of the external terminal plate is fittingly inserted, an entire peripheral edge portion of the leakage preventing plate being in contact with the curl portion.

7. The cylindrical alkaline storage battery according to claim 6, wherein the leakage preventing plate includes polypropylene, and has a thickness of 0.05 to 0.3 mm.

* * * * *